Nov. 25, 1924.

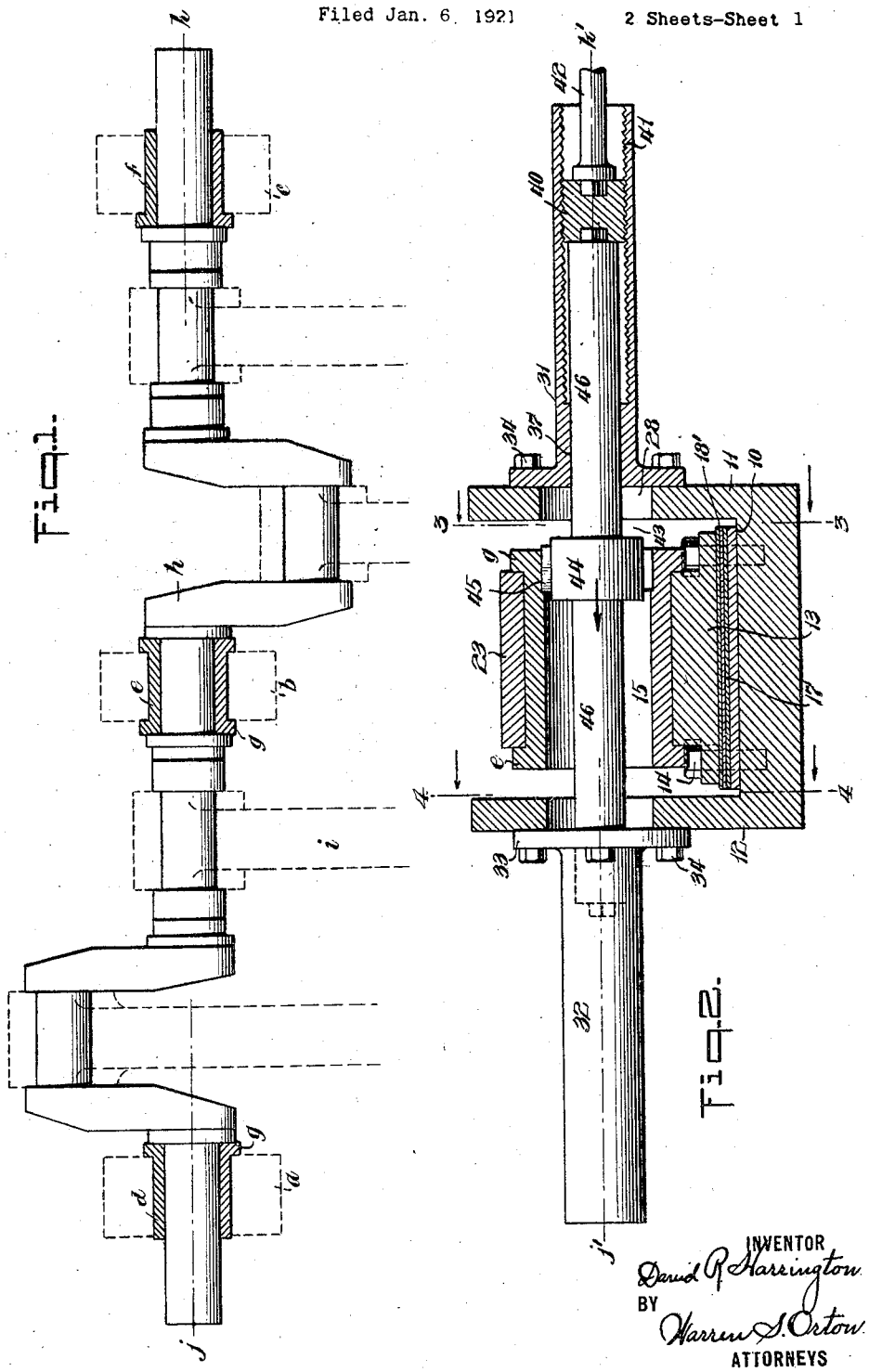

D. R. HARRINGTON 1,516,853

CRANK CASING BORING DEVICE

Filed Jan. 6, 1921

INVENTOR
David R. Harrington.
BY
Warren S. Orton.
ATTORNEYS

Patented Nov. 25, 1924.

1,516,853

UNITED STATES PATENT OFFICE.

DAVID R. HARRINGTON, OF ELMHURST, NEW YORK.

CRANK-CASING-BORING DEVICE.

Application filed January 6, 1921. Serial No. 435,411.

*To all whom it may concern:*

Be it known that I, DAVID R. HARRINGTON, a citizen of the United States, and resident of Elmhurst, in the county of Queens and State of New York, have invented certain new and useful Improvements in Crank-Casing-Boring Devices, of which the following is a specification.

The invention relates to an improvement in a method and apparatus for machining bearing shells, and this application constitutes a companion application of Serial No. 435,410, filed under even date, entitled "Method and apparatus for drilling connecting rods."

The subject matters of this application, together with the companion application above identified, are cooperatively intended to improve the power transmitting construction between the pistons of multicylinder engines and the power shaft driven by the actuation of the pistons and particularly relates to an improved means for truing the different bearings of the connecting rod and crank shaft so that there will be produced a smooth, practically non-wearing or at least a uniform wearing of the several bearings and in this way there is featured an efficient actuation of the engine parts.

In the companion application there is specifically featured an improved method and apparatus for truing the wrist pin and crank shaft bearings in the connecting rods, and in this application there is featured the machining of the crank case bearing shells but it is intended in order to feature economy that one apparatus be utilized, with necessary attachments, to perform the operations featured in both of these applications.

The invention is described hereinafter particularly in connection with the truing of a set of bearing brasses or shells intended for use in a crank case of the type usually found in automotive power constructions, but it is understood that this suggestive use of the method and apparatus is merely illustrative of any similar situation where it is desired to machine bearing shells for use in supporting a shaft of any character.

It is understood that in conventional forms of bearing mountings, such as crank cases, the same is usually formed of parts separable along the line of the bearings and that the contacting surfaces of these parts are flat with bearing supports as substantially semi-spherical depressions in both of these flat surfaces. In the present disclosure one of these flat surfaces is conveniently adopted as a plane of reference and as in most constructions it contains the desired axis of rotation of the shaft it provides in the present disclosure a convenient means for locating the axis of rotation of the crank shaft. It is obvious that if it were possible to machine the separate bearing shells along this axis there would be provided a true bearing for the crank shaft.

Accordingly, one of the objects of the present invention is to suggest a method by which all of the bearing shells of a set can be successively mounted in a boring or other shell treating machine and disposed in relation to the axis of the machining tool corresponding to the relation which exists in the crank casing between the flat surface of reference and the axis of rotation of the crank shaft, and so manipulating the machining tool that every bearing shell is machined along the same axis of reference irrespective of its individual thickness. In this way when the machined shells are mounted in the casing, they must necessarily be in accurate alignment and correctly disposed to locate the shaft in its required position in the crank case.

In order to prevent longitudinal shifting of the crank shaft and at the same time to provide for end thrust bearings it is suggested to true the flanges at the ends of the several bearings so as to be accurately disposed in a plane perpendicular to the axis of the bearings, and further in the case of the center bearing, to true opposite ends so as to provide a definite length to this center bearing.

Accordingly, another object of the invention is to provide a simple and easily practiced method for truing the ends of the several bearings to provide for end thrust of the shaft, to prevent longitudinal movement of the shaft, and to insure a square contact between the trued ends of the bearings and the hubs of the shaft.

Still another object of the invention is to provide a simple and economically actuated form of apparatus for practicing the methods and for accommodating different forms of bearing shells with the least possible variation of adjustable parts.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the drawings:

Figure 1 is a diagrammatic showing of a crank shaft disposed in correct position in the machined bearings carried in the crank case, parts of which are shown in dotted outline;

Figure 2 is a transverse vertical sectional view taken through a machine illustrating a preferred embodiment of the mechanical features of the invention and showing one of the steps of the method feature of the invention;

Figure 3:
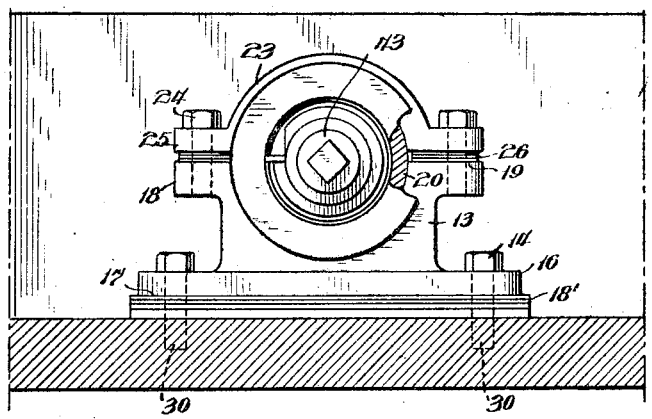
Figure 4:
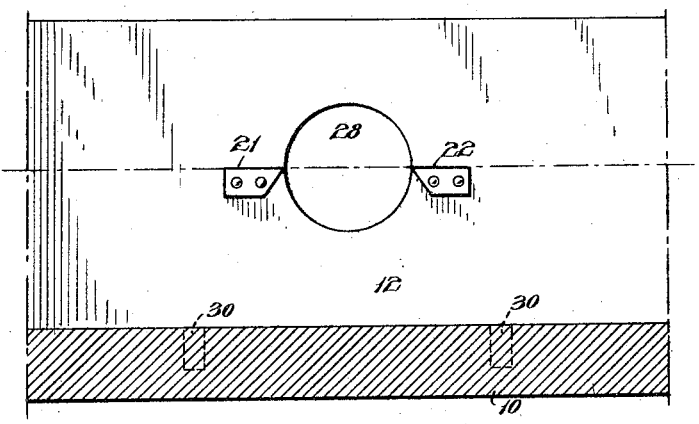

Figures 3 and 4 are respectively longitudinal vertical sectional views through the showing in Figure 2 and taken respectively on the lines 3—3 and 4—4 looking in the direction indicated by the arrows.

The device illustrated in Figures 2 to 4 is a reproduction of the central portion of the device shown in the above identified application and for the purpose of facilitating cross reference the parts are similarly numbered.

Referring to the disclosure in Figure 1 there is shown at $a$, $b$ and $c$ the left, central and right shell bearing supports of the crank casing in which supports are positioned bearing shells $d$, $e$ and $f$, of which the shells $d$ and $f$ have a flange $g$ at their inner ends and the shell $e$ has both ends provided with flanges $g$. Mounted in the machined bores of the shells is a conventional form of crank shaft $h$ operatively connected to the engine pistons (not shown) by means of connecting rods $i$ shown in dotted lines in Figure 1.

It will be understood that the axis $j$—$k$ of the shaft $h$, when mounted in the casing, is in a plane with the flat surface at the top of the lower half of the casing not shown in the drawings but of well known construction and disposed in the plane of the showing of the top of the supports $a$, $b$ and $c$ of Figure 1. This flat surface will be identified hereinafter as a plane of reference from which all necessary measurements can be taken in locating any variation of the axis $j$—$k$ from its normal position in said plane of reference.

Referring to the apparatus disclosed there is shown a box-like support for the parts hereinafter described and which includes a bottom 10 provided with a pair of transversely disposed upstanding walls 11 and 12, with the upper face of the bottom machined flat and adapted to receive a holder 13 hereinafter described. The flat bottom is provided with a plurality of bolt holes 30 for receiving bolts 14 for securing the holder to the bottom. The walls 11 and 12 are provided with transversely aligned openings 28 having a diameter sufficient to receive the tool hereinafter described.

Tool centering and advancing guides 31 and 32 project outwardly from the openings 28 and are fastened to the walls 11 and 12 by means of contacting flanges 33 held in place by bolts 34. Each of the guides is provided with a bore extending axially therethrough; the inner portion 37 of which bore is of a smooth cylindrical form, and in the outer threaded portion 41 a feed screw 40 is designed to be advanced by means of a manually actuated crank 42 or other source of power. A cutting tool 43 is designed to be mounted in the guide to extend across the device above and parallel to the upper surface of the bottom thereof. The tool includes at the center thereof a cylindrical hub 44 provided with a radially adjustable knife 45 and which knife in the illustrated embodiment of the invention is designed to be a cutting, reaming or other known form of tool for machining the bore 15 of one of the shells $e$. The tool is provided with oppositely disposed aligned shafts 46 extending from opposite sides of the hub and having a close but sliding fit in the smooth portions 37 of the bores in both of the guides and operatively connected to the screw 40 so that the advance of one or the other of the nuts will cause the tool to advance as well as rotate about an axis $j'$—$k'$. It is understood that this axis $j'$—$k'$ is intended to correspond to the axis $j$—$k$ in the showing in Figure 1.

The holder 13 is a heavy steel block provided with a lower flanged base 16 having a flat bottom 17 designed to rest on the upper face of the bottom 10, or, in case it is necessary to adjust the height of the holder to rest on thin plate risers 18' positioned between the bottom 10 and the face 17. The several parts are secured in position by means of the bolts 14 which pass through the flange, through the risers and into the bolt holes 30.

The upper end of the holder is provided with a flanged top 18, the upper surface 19 of which is machined parallel to the flat bottom 17 and this upper surface is provided with a semi-cylindrical shell receiving depression 20. This upper portion of the holder is designed to simulate the shell bearings $a$, $b$ and $c$ in the crank casing and thus the axis of the recess 20 is in the plane of the top surface 19.

It is required in the practicing of the method that the top surface 19 be accurately disposed in position to contain the axis $j'$—$k'$ of the rotating tool. In other words, it is required that this top surface of the holder be brought into the plane of reference so as to correspond with the lower of the contacting surfaces of the split crank case. In order to facilitate the locating of the top 19 with the axis of rotation of the tool, a pair of sights 21 and 22 are disposed 180° apart circumferentially of one of the openings 28 and located in fixed position on one of the inner faces of the walls as shown in Figure 4. By this arrangement it is possible, either by sighting across the top of the holder or by the use of suitable squaring tools, to insure the location of the top of the holder accurately in the plane of reference and which plane will, of course, contain the axis $j'-k'$. By means of suitable thicknesses of risers the holder may be set accurately in the desired elevated location.

The holder is provided with a cap 23 corresponding in general to the upper portion of the crank casing above the corresponding bearing support and is fastened to the flange 18 of the holder by means of bolts 24 passing through an outwardly extending flange 25.

The shell to be machined is seated in the depression 20; the top is disposed on top of the same and if necessary shims 26 are positioned between the flanges 18 and 25 so as to insure the secure holding of the shell in its located position.

Instead of the bearing shell being a continuous one-piece cylinder it is a usual construction to provide the shell in the form of a split cylinder with shims 27 positioned between the halves and the present disclosure features the machining of such built-up shells.

Where it is intended to machine the outer faces of the flanges $g$, the holder and its cap are machined to have a length to fit between the flanges of the shells as shown in Figure 2 and thus minimize any tendency of the shells to move lengthwise of the holder when the machining tool is facing the flanges. It is obvious that in the step of machining the ends of the shells some suitable form of conventional facing tool is substituted for the bore machining tool selected for illustration in Figure 2.

Describing the method in connection with the operation of the machine illustrated, it will be understood that the particular holder is selected from a set which will most nearly correspond to the size of the support in the casing. By means of the selective use of the proper thicknesses of risers the upper face of the holder is elevated, if necessary, and positioned in the plane which contains the line defined by the sights in the manner hereinbefore suggested. A shell of the proper size is mounted in the recess 20 or, in case the split shell is used, the lower shell half is mounted in the recess 20 and the upper half is positioned on the lower half with or without the use of interposed shims as the circumstances require. The cap is locked in position with or without the use of shims and all the parts are thus securely bolted in place to prevent chattering or other vibratory movement when the tool is actively disposed.

Usually one of the guides is unbolted from the machine, the proper tool positioned with one of its shafts disposed in the removed guide and the same remounted in position with the opposite shaft extending into the other or relatively fixed guide. By the actuation of the crank 42 the tool is advanced through the bore 15 in the direction of the arrow and in the manner suggested in Figure 2 with opposite ends of the tool guided by the oppositely disposed fixed guides.

It will be thus apparent that the bore 15 is machined accurately about an axis $j'-k'$ which axis is contained in the plane of reference. When the machined shell is removed to its place in the crank case it will, of course, have its axis in the plane of the surface of reference defining the split face of the casing. When the holder has been set for one bearing of a set it is not disturbed until all of the shells are machined and this is true irrespective of the thicknesses of the shells or the diameter of the bores formed in the same. The boring tool illustrated may be removed and an end facing tool substituted therefor without moving the bored shell thus insuring that the shell end face will be accurately disposed at right angles to the axis of the bore 15. In those situations where it is necessary, as in connection with the center shell $e$, that certain of the shells have a definite length, the advance of the facing tool is regulated on opposite sides to provide for the requisite advance of the facing tool as is well known in facing machines of conventional form.

Each of the shells constituting a set of bearings is successively mounted in the jig but it is of course obvious that where a particular character of bearings is to be machined frequently a one-piece jig may be constructed as part of the jig set thus eliminating the use of correcting risers.

By practicing the method herein disclosed it is possible to remove from the crank case a set of worm bearing shells simply by separating the crank case and removing or lifting the crank shaft. The removed shells are trued as suggested if this is possible, or a new set of bearings are machined as herein described, placed in the case and the crank shaft can be replaced with the assurance that its axis will be disposed in the position in which it was originally intended to be located. This insures a steady rotation of the shaft about its axis, limits any possible end play and in thus setting the crank shaft true to its axis of rotation contributes to the efficient transmission of power between the pistons and the power shaft.

Having thus described my invention, I claim:

In a device of the class described, the combination of a support including a bottom having a flat upper face, and a pair of upstanding walls, said walls provided with transversely aligned circular openings, sighting means defining the diameter of one of said openings which is parallel to said upper face of the bottom, a replaceable holder having upper and lower faces parallel to each other, positioned between the walls and with its upper face aligned with said sighting means whereby said upper face is positioned in a plane parallel to said upper face of the bottom and containing said diameter, said upper face of the holder provided with a bearing receiving recess extending parallel to and positioned below the axially projected outlines of said circular openings.

Signed at New York city in the county of New York and State of New York this 30th day of December, A. D. 1920.

DAVID R. HARRINGTON.